United States Patent
Kano et al.

(10) Patent No.: US 10,680,243 B2
(45) Date of Patent: Jun. 9, 2020

(54) NEGATIVE ELECTRODE ACTIVE MATERIAL CONTAINING CARBON AND BORON, AND NITROGEN OR PHOSPHORUS, AND BATTERY INCLUDING THE SAME

(71) Applicant: Panasonic Intellectual Property Management Co., Ltd., Osaka (JP)

(72) Inventors: Akira Kano, Osaka (JP); Ryohei Miyamae, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 70 days.

(21) Appl. No.: 16/026,047

(22) Filed: Jul. 3, 2018

(65) Prior Publication Data
US 2019/0027778 A1    Jan. 24, 2019

(30) Foreign Application Priority Data
Jul. 19, 2017    (JP) ................. 2017-140234

(51) Int. Cl.
| | | |
|---|---|---|
| *H01M 4/583* | (2010.01) | |
| *H01M 10/0525* | (2010.01) | |
| *H01M 10/0562* | (2010.01) | |
| *H01M 4/58* | (2010.01) | |
| *H01M 4/133* | (2010.01) | |
| *H01M 4/136* | (2010.01) | |
| *H01M 4/66* | (2006.01) | |
| *H01M 4/587* | (2010.01) | |
| *H01M 4/36* | (2006.01) | |
| *H01M 4/02* | (2006.01) | |

(52) U.S. Cl.
CPC ........... *H01M 4/583* (2013.01); *H01M 4/133* (2013.01); *H01M 4/136* (2013.01); *H01M 4/366* (2013.01); *H01M 4/587* (2013.01); *H01M 4/5825* (2013.01); *H01M 4/663* (2013.01); *H01M 10/0525* (2013.01); *H01M 10/0562* (2013.01); *H01M 2004/027* (2013.01); *H01M 2004/028* (2013.01)

(58) Field of Classification Search
CPC ...... H01M 4/583; H01M 4/133; H01M 4/136; H01M 4/663; H01M 4/587; H01M 4/366; H01M 10/0525; H01M 10/0562; H01M 2004/027; H01M 4/5825
See application file for complete search history.

(56) References Cited

U.S. PATENT DOCUMENTS

2015/0280230 A1    10/2015    Mizuno et al.

FOREIGN PATENT DOCUMENTS

| JP | 5-314976 | 11/1993 |
|---|---|---|
| JP | 10-162824 | 6/1998 |
| JP | 2002-110160 | 4/2002 |
| JP | 2015-053244 | 3/2015 |

OTHER PUBLICATIONS

Ishikawa et al. "Boron-carbon-nitrogen compounds as negative electrode matrices for a rechargeable lithium battery systems", Journal of Power Sources (1995), 55(1), pp. 127-130.*

Morita et al. "Layered-structure BC2N as a negative electrode matrix for a rechargeable lithium batteries", Journal of the Electrochemical Society (1992), 139(5), pp. 1227-1230.*

* cited by examiner

*Primary Examiner* — Laura Weiner
(74) *Attorney, Agent, or Firm* — McDermott Will & Emery LLP

(57) ABSTRACT

A negative electrode active material includes a plurality of layers and lithium located between the plurality of layers, each of the plurality of layers containing carbon and boron, and nitrogen or phosphorus, wherein a molar ratio of the boron to the carbon is more than 0.6.

6 Claims, 1 Drawing Sheet

NEGATIVE ELECTRODE ACTIVE MATERIAL CONTAINING CARBON AND BORON, AND NITROGEN OR PHOSPHORUS, AND BATTERY INCLUDING THE SAME

BACKGROUND

1. Technical Field

The present disclosure relates to a negative electrode active material and a battery.

2. Description of the Related Art

In lithium ion batteries in the related art, graphite is widely used as a negative electrode active material. As electric cars that use lithium ion batteries as power sources have spread rapidly, there has been an intense demand for an increased cruising distance of an electric car. In order to address this demand, it is important to increase the capacity of the negative electrode active material.

Japanese Unexamined Patent Application Publication No. 2002-110160 discloses a negative electrode active material that is denoted by composition formula $A_xB_yC_{1-y}$ (A represents a metal element, and atomic ratios x and y satisfy 0.2≤x≤1 and 0.2≤y≤0.5, respectively) for a nonaqueous electrolyte secondary battery.

SUMMARY

In one general aspect, the techniques disclosed here feature a negative electrode active material including a plurality of layers and lithium located between the plurality of layers, each of the plurality of layers containing carbon and boron, and nitrogen or phosphorus, wherein a molar ratio of the boron to the carbon is more than 0.6.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
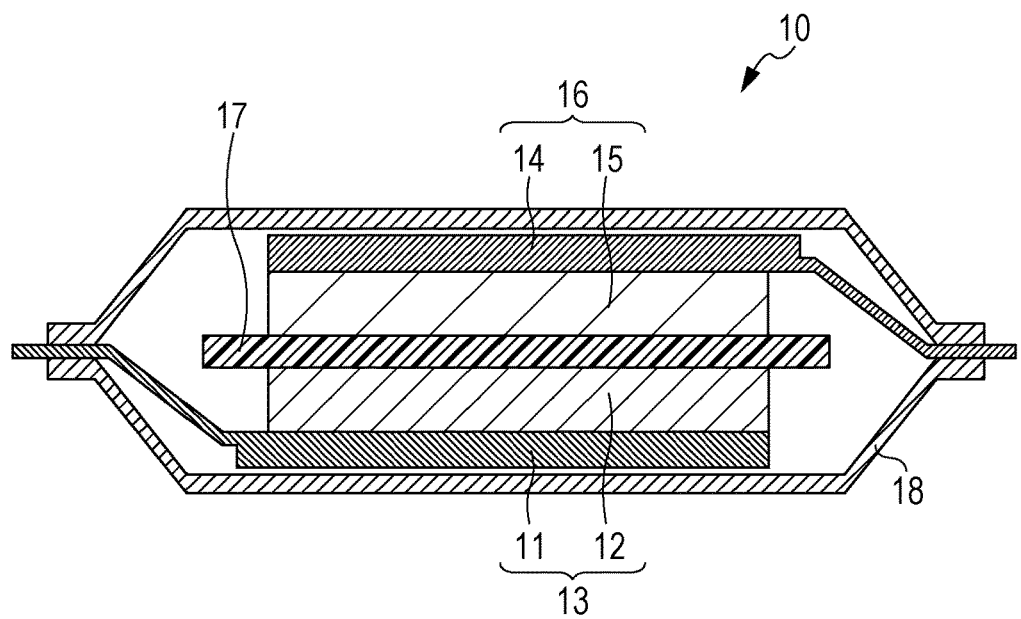
FIG. 1 is a schematic sectional view of a battery according to an embodiment of the present disclosure.

Underlying Knowledge Forming Basis of Present Disclosure

The present inventors investigated in detail the negative electrode active material disclosed in Japanese Unexamined Patent Application Publication No. 2002-110160. As a result, it was found that when the negative electrode active material was used for a lithium ion battery, the range of the charge and discharge voltage was a wide range of 0 to 3 V relative to a lithium reference electrode. From a practical standpoint, it is desirable that the capacity be increased in a voltage range of 0 to 2 V in cases in which a negative electrode active material is commonly used. The present inventors arrived at the configuration of the present disclosure on the basis of the above-described viewpoints.

A negative electrode active material according to a first aspect of the present disclosure includes: a layer structure composed of carbon and boron, and nitrogen or phosphorus; and lithium.

The negative electrode active material according to the first aspect has a high discharge capacity density.

In a second aspect of the present disclosure, for example, the layer structure of the negative electrode active material according to the first aspect has interlayer portions, and the lithium is present in the interlayer portions. According to the second aspect, a negative electrode active material having a higher discharge capacity can be realized.

In a third aspect of the present disclosure, for example, the negative electrode active material according to the first or second aspect is denoted by composition formula (1) described below. According to the third aspect, a negative electrode active material having a higher discharge capacity can be realized.

$$Li_xB_yC_zM_q \qquad (1)$$

(in formula (1), M represents nitrogen or phosphorus, each of x, y, z, and q is a value more than 0, and the relationship of y>q is satisfied)

In a fourth aspect of the present disclosure, for example, composition formula (1) of the negative electrode active material according to the third aspect satisfies the relationship of 0.1≤q/y≤0.5. According to the fourth aspect, a balance between an increase in discharge capacity density and an improvement in electrical conductivity can be achieved.

In a fifth aspect of the present disclosure, for example, M in composition formula (1) of the negative electrode active material according to the third or four aspect represents nitrogen. When M represents nitrogen, a negative electrode active material having a higher discharge capacity can be realized.

A battery according to a sixth aspect of the present disclosure includes
 a negative electrode according to any one of the first to fifth aspects,
 a positive electrode, and
 an electrolyte.

According to the sixth aspect, a battery having a high discharge capacity can be provided.

In a seventh aspect of the present disclosure, for example, the negative electrode of the battery according to the sixth aspect contains the above-described negative electrode active material as a primary component. According to the seventh aspect, a battery having a higher discharge capacity density can be realized.

The embodiments according to the present disclosure will be described. The present disclosure is not limited to the embodiments described below.

First Embodiment

A negative electrode active material according to the present embodiment contains lithium and has a layer structure. Lithium is supported by the layer structure. The layer structure is composed of carbon and boron, and nitrogen or phosphorus.

The present inventors examined changes in the discharge capacity density of a negative electrode active material produced by forming a solid solution of a hexagonal structure $Li_xB_yC_{1-y}$ (x and y satisfy $0.2 \leq x \leq 1$ and $0.2 \leq y \leq 0.5$) and nitrogen. As a result, the resulting negative electrode active material exhibited a higher discharge capacity density than $Li_xB_yC_{1-y}$. The reason for this is considered to be as described below, for example.

Graphite occludes lithium into interlayer portions thereof. A lithium atom is occluded by six carbon atoms ($LiC_6$). Meanwhile, a graphite analog (MeBC, where Me represents a metal element, B represents boron, and C represents carbon), which can occlude more metal cations into interlayer portions, can be synthesized by heat-treating a mixture of graphite, a metal, and a boron compound. For example, LiBC and $Mg_{0.5}BC$ are graphite analogs in which half the carbon atoms in a graphite crystal are substituted with boron atoms. In the interlayer portions of the graphite analog, 1.5 to 3 metal cations are present for every six atoms in total of carbon atoms and boron atoms.

The electron number of a boron atom is less than the electron number of a carbon atom by one. Consequently, when boron forms a solid solution with graphite, the electron density of the resulting graphite analog is lower than the electron density of graphite.

When the electron density decreases, the graphite analog readily receives electrons from metal cations. It is conjectured that, as a result, more metal cations can be present in interlayer portions of the graphite analog compared with graphite.

However, a graphite analog such as MeBC has a disadvantage. That is, defects are generated in a π electron cloud that spreads over the graphene surface due to formation of a solid solution of graphite with boron. It is considered that the electrical conductivity of MeBC is degraded compared with graphite, which is an intrinsic conductor. In order to achieve a higher discharge capacity density, the electrical conductivity has to be improved. The electrical conductivity is improved by forming a solid solution of graphite with nitrogen or phosphorus, which are group 15 elements. A nitrogen atom or a phosphorus atom has one more valence electron than a carbon atom. Consequently, the nitrogen atom and the phosphorus atom eliminate electron defects generated due to formation of a solid solution with boron and improve the electrical conductivity of a graphite analog.

In the negative electrode active material according to the present embodiment, the layer structure may have interlayer portions. At this time, lithium may be present in the interlayer portions. According to such a configuration, a negative electrode active material having a higher discharge capacity can be realized.

The negative electrode active material according to the present embodiment may be a material denoted by composition formula (1) described below. In composition formula (1), M represents nitrogen or phosphorus. Each of x, y, z, and q is a value more than 0. In composition formula (1), the relationship represented by y>q may be satisfied.

$$Li_xB_yC_zM_q \quad (1)$$

Inequality y>q indicates that the number of boron atoms is more than the number of nitrogen atoms (B>N) or that the number of boron atoms is more than the number of phosphorus atoms (B>P). When such a relationship applies, the discharge capacity density of the negative electrode active material can be sufficiently increased. Considering that a decrease in electron density caused by formation of a solid solution with boron is the factor for the increase in the number of metal cations occluded in interlayer portions, it is conjectured that formation of a solid solution with nitrogen or phosphorus in an amount not canceling the effect of increasing the amount of metal cations occluded is effective. In other words, it is conjectured that formation of a solid solution with a group 15 element in an amount less than the amount of boron atoms is effective for increasing the amount of metal cations occluded.

Composition formula (1) may satisfy the relationship represented by $0.1 \leq q/y \leq 0.5$. That is, in the negative electrode active material according to the present embodiment, the relationship represented by $0.1 \leq$(number of nitrogen atoms)/(number of boron atoms)$\leq 0.5$ or $0.1 \leq$(number of phosphorus atoms)/(number of boron atoms)$\leq 0.5$ may be satisfied. A balance between an increase in discharge capacity density and an improvement in electrical conductivity can be achieved by appropriately adjusting the amount of nitrogen or the amount of phosphorus.

Composition formula (1) may satisfy the relationship represented by $0.6 < y/z < 1.0$ and may further satisfy $0.67 \leq y/z \leq 0.91$. A high discharge capacity can be obtained by satisfying these conditions, as is clarified by examples described later.

When the negative electrode active material according to the present embodiment is used for a secondary battery, the value of x in composition formula (1) changes depending on charge and discharge of the secondary battery. For example, $0.9 < x/z < 1.1$ may be satisfied in a fully charged state of the secondary battery, or $0.2 < x/z < 0.4$ may be satisfied in a fully discharged state of the secondary battery. The former condition results from a synthesized negative electrode active material containing lithium atoms in a number on the scale of the number of carbon atoms. The latter condition results from some lithium atoms remaining in the negative electrode active material, even in a fully discharged state.

In the present disclosure, "fully charged state" refers to a state in which charging has been performed at a constant current (for example, 0.05 C relative to a theoretical capacity) to a predetermined voltage (for example, a negative electrode potential of 0 V with reference to a lithium reference electrode). On the other hand, "fully discharged state" refers to a state in which discharging has been performed at a constant current (for example, 0.05 C relative to a theoretical capacity) to a predetermined voltage (for example, a negative electrode potential of 2 V with reference to a lithium reference electrode).

In composition formula (1), M may represent nitrogen. When M represents nitrogen, a negative electrode active material having a higher discharge capacity can be realized.

The negative electrode active material according to the present embodiment can be identified by determining the space group of the crystal structure of the negative electrode active material. The space group is identified by powder X-ray diffractometry. The composition of the negative electrode active material is identified by, for example, ICP emission spectrometry, an inert-gas fusion-infrared-absorbing analysis method, and an inert-gas fusion-thermal-conductivity method.

The negative electrode active material according to the present embodiment may be produced by a method described below.

A carbon source, a boron source, a lithium source, and a nitrogen source or phosphorus source are sufficiently mixed. The resulting mixture is fired in an inert atmosphere. As a result, the negative electrode active material according to the present embodiment is produced.

Regarding the carbon source, at least one selected from the group consisting of graphite materials, organic materials, and amorphous carbon materials may be used. When a graphite material is used as the carbon source, formation of a solid solution of the graphite material with boron, nitrogen, and lithium advances at the same time. When an organic material or amorphous carbon material is used as the carbon source, graphitization of the carbon source and formation of a solid solution of graphite with each element advance at the same time.

Regarding the organic material, synthetic resins, e.g., polyvinyl alcohol, may be used. There is no particular limitation regarding the form of the synthetic resin, and examples of the form include a sheet, fibers, and particles. In consideration of processing after firing, the organic material may be a synthetic resin in the form of particles or short fibers having a size of 1 to 100 µm.

Regarding the amorphous carbon material, soft carbon, e.g., petroleum coke and coal coke, may be used. There is no particular limitation regarding the form of the soft carbon, and examples of the form include a sheet, fibers, and particles. In consideration of processing after firing, the form of the soft carbon may be particles or short fibers having a size of 1 to 100 µm.

Regarding the boron source, boron, boric acid, boron nitride, lithium boride, and the like may be used. Diborides, e.g., aluminum diboride and magnesium diboride, may also be used as the boron source.

Regarding the lithium source, lithium metal, lithium hydride, lithium hydroxide, lithium carbide, lithium carbonate, and the like may be used.

Regarding the nitrogen source, ammonia, boron nitride, cyanides, carbon nitride, nitrogen-containing organic materials, and the like may be used. The carbon nitride may be graphitic carbon nitride. Examples of nitrogen-containing organic materials include porphyrin, phthalocyanine, pyridine, phenanthroline, and derivatives thereof.

Regarding the phosphorus source, phosphorus, boron phosphide, phosphoric acid, lithium phosphate, and the like may be used.

The firing temperature is, for example, 800° C. to 1,500° C. The firing atmosphere is, for example, an inert atmosphere. Regarding the inert atmosphere, for example, inert gasses, e.g., nitrogen gas, argon gas, helium gas, and neon gas, may be used. The inert atmosphere may be nitrogen gas from the viewpoint of cost.

Carbonization of a raw material is advanced by firing at a temperature lower than 800° C. because elements other than carbon are vaporized from the raw material used as the carbon source. Graphitization of carbon is advanced by firing at 800° C. to 1,500° C. Reactions between the carbon source and each of the boron source, the nitrogen source, and the lithium source occur with graphitization of carbon. As a result, formation of a solid solution of a graphite crystal with boron and nitrogen advances while lithium enters interlayer portions of graphite so as to form a solid solution.

The ratio of constituent elements in the negative electrode active material can be adjusted by appropriately selecting the type of raw materials, the mixing ratio of the raw materials, the firing condition of the raw material mixture, the reprocessing condition after firing, and the like. The type of raw materials refers to the type of the carbon source, the type of the boron source, the type of the lithium source, the type of the nitrogen source, and the type of the phosphorus source. The mixing ratio of the raw materials refers to the mixing ratio of each of the carbon source, the boron source, the lithium source, and the nitrogen source or the phosphorus source. Examples of reprocessing after firing include acid washing and additional heat treatment.

As described above, the negative electrode active material according to the present embodiment may be produced through a step of mixing the raw materials and a step of firing the resulting raw material mixture in an inert atmosphere. In the step of mixing the raw materials, the carbon source, the boron source, the lithium source, and the nitrogen source or the phosphorus source are mixed.

Second Embodiment

A second embodiment will be described below. The same explanations as those in the first embodiment will be omitted appropriately.

As shown in FIG. 1, a battery 10 according to the present embodiment includes a negative electrode 13, a positive electrode 16, a separator 17, and an outer jacket 18. The negative electrode 13 includes a negative electrode collector 11 and a negative electrode active material layer 12 (negative electrode mix layer). The negative electrode active material layer 12 is disposed on the negative electrode collector 11. The positive electrode 16 includes a positive electrode collector 14 and a positive electrode active material layer 15 (positive electrode mix layer). The positive electrode active material layer 15 is disposed on the positive electrode collector 14. The separator 17 is arranged between the negative electrode 13 and the positive electrode 16. The negative electrode 13 and the positive electrode 16 are opposite to each other with the separator 17 interposed therebetween. The negative electrode 13, the positive electrode 16, and the separator 17 are accommodated in the outer jacket 18.

The battery 10 is, for example, a nonaqueous electrolyte secondary battery or an all-solid secondary battery. The battery 10 is typically a lithium ion secondary battery.

The negative electrode active material layer 12 contains the negative electrode active material described in the first embodiment. The negative electrode active material layer 12 may contain a second negative electrode active material, a conductive auxiliary agent, an ionic conductor, a binder, and the like, as necessary. The second negative electrode active material is a negative electrode active material having a composition different from the composition of the negative electrode active material described in the first embodiment and is a material that can occlude and release lithium ions.

The negative electrode active material layer 12 may contain the negative electrode active material described in the first embodiment as a primary component. "Primary component" refers to a component, the content of which is the largest on a mass ratio basis. The negative electrode active material layer 12 may contain the negative electrode active material described in the first embodiment in a mass ratio of 50% or more relative to the total negative electrode active material layer 12, or may contain in 70% or more. According to such a configuration, the battery 10 having a higher discharge capacity density can be realized.

The negative electrode active material layer 12 contains the negative electrode active material as a primary component and may further contain incidental impurities. Examples of incidental impurities include starting raw materials used for synthesizing the negative electrode active material, by-products generated when the negative electrode active material is synthesized, and decomposition products thereof. The negative electrode active material layer 12 may contain the negative electrode active material described in the first embodiment in a mass ratio of 100% relative to the total negative electrode active material layer 12 except for incidental impurities.

The conductive auxiliary agent and the ionic conductor are used to reduce the resistance of the negative electrode 13. Regarding the conductive auxiliary agent, carbon materials (carbon conductive auxiliary agent), e.g., carbon black, graphite, and acetylene black, and conductive high-molecular-weight compounds, e.g., polyanilines, polypyrroles, and polythiophenes, may be used. Regarding the ionic conductor, gel electrolytes, e.g., polymethyl methacrylate, organic solid electrolytes, e.g., polyethylene oxide, and inorganic solid electrolytes, e.g., $Li_7La_3Zr_2O_{12}$, may be used.

The binder is used to improve the binding properties of materials constituting the negative electrode 13. Regarding the binder, high-molecular-weight materials, e.g., polyvinylidene fluorides, vinylidene fluoride-hexafluoropropylene copolymers, vinylidene fluoride-tetrafluoroethylene copolymers, polytetrafluoroethylenes, carboxymethyl cellulose, polyacrylic acids, styrene-butadiene copolymer rubbers, polypropylenes, polyethylenes, and polyimides, may be used.

Regarding the negative electrode collector 11, a sheet or film that is formed of a metal material, e.g., stainless steel, nickel, copper, or an alloy thereof, may be used. The sheet or film may be porous or nonporous. Regarding the sheet or film, metal foil, metal mesh, or the like is used. The surface of the negative electrode collector 11 may be coated with a carbon material, e.g., carbon, serving as a conductive auxiliary material. In this case, the resistance value may be reduced, a catalytic effect may be provided, and the bonding force between the negative electrode active material layer 12 and the negative electrode collector 11 may be enhanced by chemically or physically bonding the negative electrode active material layer 12 to the negative electrode collector 11.

The positive electrode active material layer 15 contains a positive electrode active material that can occlude and release lithium ions. The positive electrode active material layer 15 may contain a conductive auxiliary agent, an ionic conductor, a binder, and the like, as necessary. Regarding the conductive auxiliary agent, the ionic conductor, and the binder, the same materials as the materials usable for the negative electrode active material layer 12 can be used for the positive electrode active material layer 15.

Regarding the positive electrode active material, lithium-containing transition metal oxides, transition metal fluorides, polyanionic materials, fluorinated polyanionic materials, transition metal sulfides, and the like may be used. The positive electrode active material may be a lithium-containing transition metal oxide because of an inexpensive production cost and a high average discharge voltage.

Regarding the positive electrode collector 14, a sheet or film that is formed of a metal material, e.g., aluminum, stainless steel, titanium, or an alloy thereof, may be used. Aluminum or an alloy thereof is suitable for a material for forming the positive electrode collector 14 because of a low price and being readily made into a thin film. The sheet or film may be porous or nonporous. Regarding the sheet or film, metal foil, metal mesh, or the like is used. The surface of the positive electrode collector 14 may be coated with a carbon material, e.g., carbon, serving as a conductive auxiliary material. In this case, the resistance value may be reduced, a catalytic effect may be provided, and the bonding force between the positive electrode active material layer 15 and the positive electrode collector 14 may be enhanced by chemically or physically bonding the positive electrode active material layer 15 to the positive electrode collector 14.

The battery 10 further includes an electrolyte. The electrolyte may be a nonaqueous electrolyte. Regarding the electrolyte, an electrolytic solution containing a lithium salt and a nonaqueous solvent, a gel electrolyte, a solid electrolyte, and the like may be used. When the electrolyte is liquid, each of the negative electrode 13, the positive electrode 16, and the separator 17 is impregnated with the electrolyte. When the electrolyte is solid, the separator 17 may be composed of the electrolyte. A solid electrolyte may be included in the negative electrode 13 or included in the positive electrode 16.

Regarding the lithium salt, lithium hexafluorophosphate ($LiPF_6$), lithium tetrafluoroborate ($LiBF_4$), lithium perchlorate ($LiClO_4$), lithium bistrifluoromethylsulfonylimide ($LiN(SO_2CF_3)_2$), lithium bisperfluoroethylsulfonylimide ($LiN(SO_2C_2F_5)_2$), lithium bisfluoromethylsulfonylimide ($LiN(SO_2F)_2$), $LiAsF_6$, $LiCF_3SO_3$, lithium difluoro(oxalato)borate, and the like may be used. One electrolyte salt selected from these lithium salts may be used, or at least two types may be used in combination. The lithium salt may be $LiPF_6$ from the viewpoint of safety, thermal stability, and ionic conductivity of the battery 10.

Regarding the nonaqueous solvent, a cyclic carbonic acid ester, a chain carbonic acid ester, an ester, a cyclic ether, a chain ether, a nitrile, an amide, and the like may be used. One solvent selected from these solvents may be used, or at least two types may be used in combination.

Regarding the cyclic carbonic acid ester, ethylene carbonate, propylene carbonate, butylene carbonate, and the like may be used. In these compounds, some or all hydrogen atoms may be substituted with fluorine atoms. Trifluoropropylene carbonate, fluoroethyl carbonate, and the like may be used as a fluorine-substituted cyclic carbonic acid ester.

Regarding the chain carbonic acid ester, dimethyl carbonate, ethyl methyl carbonate, diethyl carbonate, methyl propyl carbonate, ethyl propyl carbonate, methyl isopropyl carbonate, and the like may be used. In these compounds, some or all hydrogen atoms may be substituted with fluorine atoms.

Regarding the ester, methyl acetate, ethyl acetate, propyl acetate, methyl propionate, ethyl propionate, γ-butyrolactone, and the like may be used.

Regarding the cyclic ether, 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, crown ethers, and the like may be used.

Regarding the chain ether, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like may be used.

Acetonitrile and the like may be used as the nitrile.

Dimethylformamide and the like may be used as the amide.

An organic polymer solid electrolyte, an oxide solid electrolyte, a sulfide solid electrolyte, and the like may be used as the solid electrolyte.

A compound of a high-molecular-weight material and a lithium salt may be used as the organic polymer solid electrolyte. The high-molecular-weight material may has an ethylene oxide structure. When the high-molecular-weight material has an ethylene oxide structure, the organic polymer solid electrolyte can contain a large amount of lithium salt and, thereby, ionic conductivity of the organic polymer solid electrolyte is enhanced.

Regarding the oxide solid electrolyte, NASICON-type solid electrolytes represented by $LiTi_2(PO_4)_3$ and element-substituted compounds thereof, $(LaLi)TiO_3$-based perovskite solid electrolytes, LaSiCON-type solid electrolyte represented by $Li_{14}ZnGe_4O_{16}$, $Li_4SiO_4$, $LiGeO_4$, and element-substituted compounds thereof, garnet-type solid electrolytes represented by $Li_7La_3Zr_2O_{12}$ and element-substituted compounds thereof, $Li_3N$ and H-substituted compounds thereof, $Li_3PO_4$ and N-substituted compounds thereof, and the like may be used.

Regarding the sulfide solid electrolyte, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, $Li_{10}GeP_2S_{12}$, and the like may be used.

LiX (X: F, Cl, Br, or I), $MO_p$, $Li_qMO_p$ (M: P, Si, Ge, B, Al, Ga, or In) (p, q: natural number), and the like may be added to these sulfide materials.

The sulfide solid electrolyte has high moldability and high ionic conductivity. Consequently, the battery 10 having a higher energy density can be realized by using the sulfide solid electrolyte as the solid electrolyte. Among sulfide solid electrolytes, $Li_2S$—$P_2S_5$ has high electrochemical stability and high ionic conductivity. The battery 10 having a higher energy density can be realized by using $Li_2S$—$P_2S_5$ as the solid electrolyte.

There is no particular limitation regarding the shape of the battery 10. Various shapes of coin type, cylinder type, rectangular type, sheet type, button type, flat type, layered type, and the like may be adopted as the shape of the battery 10.

EXAMPLES

Some instances will be described below as examples, but the present disclosure is not limited to the following examples.

Example 1

Production of Negative Electrode Active Material

A graphite powder having an average particle diameter of 20 μm, a boron powder, a lithium hydride powder, and a boron nitride powder were ground and mixed by using an agate mortar so as to produce a raw material mixture. The amount of the boron powder was 67.5% relative to the graphite powder on a mass basis. The amount of the lithium hydride powder was 66.2% relative to the graphite powder on a mass basis. The amount of the boron nitride powder was 51.7% relative to the graphite powder on a mass basis.

The raw material mixture was put into a firing furnace in an Ar atmosphere (Ar gas flow rate of 1 L/min), the temperature inside the firing furnace was increased from room temperature at a rate of 5° C./min so as to reach 1,000° C., and the temperature was maintained at 1,000° C. for 5 hours. Thereafter, heating was stopped, and a fired product was cooled naturally and taken out of the firing furnace. The fired product was ground in an agate mortar so as to produce a powder of a negative electrode active material of example 1.

Figure 2:
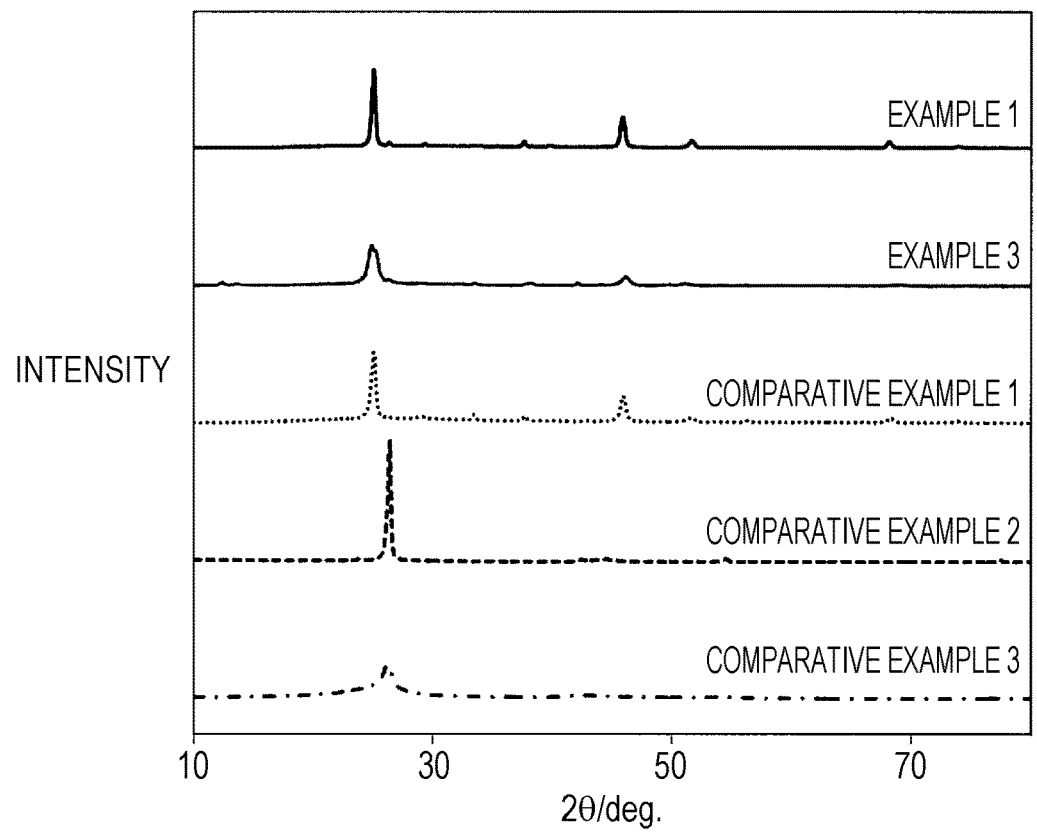
FIG. 2 is a diagram showing XRD spectra of negative electrode active materials of example 1, example 3, comparative example 1, comparative example 2, and comparative example 3.

The negative electrode active material of example 1 was subjected to a powder X-ray diffraction measurement. The result is shown in FIG. 2. The negative electrode active material of example 1 showed the same diffraction pattern as the diffraction pattern of LiBC. The space group of the negative electrode active material of example 1 was the same as the space group P63/mmc of LiBC. That is, the negative electrode active material of example 1 had a layer structure analogous to LiBC. The composition of the negative electrode active material of example 1 was examined by ICP emission spectrometry, an inert-gas fusion-infrared-absorbing analysis method, and an inert-gas fusion-thermal-conductivity method. The composition of the negative electrode active material of example 1 was $LiB_{0.75}CN_{0.25}$.

Production of Test Electrode

The negative electrode active material of example 1, acetylene black serving as a conductive auxiliary agent, and polyvinylidene fluoride serving as a binder were sufficiently mixed by using an agate mortar. As a result, a negative electrode mix was produced. The mass ratio of the negative electrode active material to acetylene black to polyvinylidene fluoride was 7:2:1. The negative electrode mix was dispersed into an NMP solvent so as to produce a slurry. A Cu collector was coated with the slurry by using a coater. A coating film on the Cu collector was dried so as to produce an electrode plate. The electrode plate was rolled by a rolling mill and, thereafter, was stamped into a 20 mm square shape. A lead terminal was attached to the electrode plate having a square shape so as to produce a test electrode of example 1.

Production of Evaluation Cell.

A lithium secondary battery (evaluation cell) was produced by using the test electrode of example 1, a lithium metal counter electrode, and a lithium metal reference electrode in a method described below. Preparation of the electrolytic solution and production of the evaluation cell were performed in a glove box in an Ar atmosphere having a dew point of −60° C. or lower and an oxygen value of 1 ppm or less.

A mixed solvent was produced by mixing ethylene carbonate and dimethyl carbonate in a volume ratio of 25:75. Lithium hexafluorophosphate ($LiPF_6$) was dissolved into the resulting mixed solvent so as to produce an electrolytic solution having a concentration of 1 mol/liter. Lithium metal foil was pressure-bonded to a 20 mm square nickel mesh so as to produce a counter electrode. A polyethylene microporous film separator was impregnated with the electrolytic solution. The separator was arranged between the test electrode and the counter electrode so as to oppose the test electrode to the counter electrode.

The test electrode and the counter electrode were accommodated in an outer jacket, and the outer jacket was sealed. In this manner, the evaluation cell of example 1 was produced.

Charge Discharge Test

The evaluation cell was subjected to a charge discharge test, and the charge discharge characteristics were evaluated. The charge discharge test was performed in a thermostatic chamber at 25° C. In the charge discharge test, the evaluation cell was charged, and after suspension for 20 minutes, the evaluation cell was discharged. Charging was performed at a constant current of 16.5 mA per gram of negative electrode active material until the potential difference between the test electrode and the reference electrode reached 0 V (Li ions were occluded by the negative electrode active material). Subsequently, discharging was performed at a constant current of 16.5 mA per gram of negative electrode active material until the potential difference between the test electrode and the reference electrode reached 2 V (Li ions were released from the negative electrode active material). In this manner, an initial discharge capacity was examined. The discharge capacity density of the negative electrode active material of example 1 was 622 mAh/g.

Example 2

A negative electrode active material of example 2 was produced in the same manner as example 1 except that the ratio of the raw materials were changed. In example 2, the amount of the boron powder was 60.3% relative to the graphite powder on a mass basis. The amount of the lithium hydride powder was 66.2% relative to the graphite powder on a mass basis.

The amount of the boron nitride powder was 68.2% relative to the graphite powder on a mass basis.

The negative electrode active material of example 2 had a layer structure analogous to LiBC. The composition of the negative electrode active material of example 2 was $LiB_{0.67}CN_{0.33}$. A test electrode and an evaluation cell was produced by using the negative electrode active material of example 2, and the charge discharge characteristics were evaluated. The initial discharge capacity of the negative electrode active material of example 2 was 653 mAh/g.

Example 3

A graphite powder having an average particle diameter of 20 μm, a boron powder, a lithium hydride powder, and a graphitic carbon nitride (g-$C_3N_4$) powder were ground and mixed by using an agate mortar so as to produce a raw material mixture. The amount of the boron powder was 90.9% relative to the graphite powder on a mass basis. The amount of the lithium hydride powder was 73.5% relative to the graphite powder on a mass basis. The amount of the graphitic carbon nitride powder was 24.1% relative to the graphite powder on a mass basis.

The resulting raw material mixture was used, and a negative electrode active material of example 3 was produced in the same manner as example 1.

The negative electrode active material of example 3 was subjected to a powder X-ray diffraction measurement. The result is shown in FIG. 2. The negative electrode active material of example 3 had a layer structure analogous to LiBC. The composition of the negative electrode active material of example 3 was $LiB_{0.91}CN_{0.10}$. A test electrode and an evaluation cell was produced by using the negative electrode active material of example 3, and the charge discharge characteristics were evaluated. The initial discharge capacity of the negative electrode active material of example 3 was 590 mAh/g.

Example 4

A negative electrode active material of example 4 was produced in the same manner as example 3 except that the ratio of the raw materials were changed. The amount of the boron powder was 101.3% relative to the graphite powder on a mass basis. The amount of the lithium hydride powder was 82.7% relative to the graphite powder on a mass basis. The amount of the graphitic carbon nitride powder was 54.2% relative to the graphite powder on a mass basis.

The negative electrode active material of example 4 had a layer structure analogous to LiBC. The composition of the negative electrode active material of example 4 was $LiB_{0.9}CN_{0.18}$. A test electrode and an evaluation cell was produced by using the negative electrode active material of example 4, and the charge discharge characteristics were evaluated. The initial discharge capacity of the negative electrode active material of example 4 was 537 mAh/g.

Comparative Example 1

A graphite powder having an average particle diameter of 20 μm, a boron powder, and a lithium hydride powder were ground and mixed by using an agate mortar so as to produce a raw material mixture. The amount of the boron powder was 90.0% relative to the graphite powder on a mass basis. The amount of the lithium hydride powder was 66.2% relative to the graphite powder on a mass basis.

The resulting raw material mixture was used, and a negative electrode active material of comparative example 1 was produced in the same manner as example 1.

The negative electrode active material of comparative example 1 was subjected to a powder X-ray diffraction measurement. The result is shown in FIG. 2. The negative electrode active material of comparative example 1 had a layer structure analogous to LiBC. The composition of the negative electrode active material of comparative example 1 was $Li_{1.05}B_{0.94}C$. A test electrode and an evaluation cell was produced by using the negative electrode active material of comparative example 1, and the charge discharge characteristics were evaluated. The initial discharge capacity of the negative electrode active material of comparative example 1 was 502 mAh/g.

Comparative Example 2

A graphite powder having an average particle diameter of 20 μm was used as a negative electrode active material of comparative example 2. The graphite powder was subjected to a powder X-ray diffraction measurement. The result is shown in FIG. 2. The negative electrode active material of comparative example 2 had a layer structure. A test electrode and an evaluation cell was produced by using the negative electrode active material of comparative example 2, and the charge discharge characteristics were evaluated. The initial discharge capacity of the negative electrode active material of comparative example 2 was 343 mAh/g.

Comparative Example 3

A soft carbon powder having an average particle diameter of 20 μm and a boron nitride powder were ground and mixed by using an agate mortar. The amount of the boron nitride powder was 103.3% relative to the soft carbon powder on a mass basis.

The resulting raw material mixture was used, and a negative electrode active material of comparative example 3 was produced in the same manner as example 1.

The negative electrode active material of comparative example 3 was subjected to a powder X-ray diffraction measurement. The result is shown in FIG. 2. The negative electrode active material of comparative example 3 had a layer structure analogous to graphite. The composition of the negative electrode active material of comparative example 3 was $B_{0.45}CN_{0.51}$. A test electrode and an evaluation cell was produced by using the negative electrode active material of comparative example 3, and the charge discharge characteristics were evaluated. The initial discharge capacity of the negative electrode active material of comparative example 3 was 280 mAh/g.

When the negative electrode active material of each of examples 1 to 4 and comparative example 3 was denoted by a composition formula $Li_xB_yC_zM_q$ (M represented nitrogen or phosphorus), the value of q/y was calculated. The results are shown in Table.

TABLE

| | Composition | q/y | Initial discharge capacity (mAh/g) |
|---|---|---|---|
| Example 1 | $LiB_{0.75}CN_{0.25}$ | 0.33 | 622 |
| Example 2 | $LiB_{0.67}CN_{0.33}$ | 0.49 | 653 |
| Example 3 | $LiB_{0.91}CN_{0.10}$ | 0.11 | 590 |
| Example 4 | $LiB_{0.9}CN_{0.18}$ | 0.19 | 537 |
| Comparative example 1 | $Li_{1.05}B_{0.94}C$ | — | 502 |
| Comparative example 2 | graphite | — | 343 |
| Comparative example 3 | $B_{0.45}CN_{0.51}$ | 1.13 | 280 |

As shown in Table, the discharge capacity increased when the layer structure analogous to LiBC formed solid solution with nitrogen (examples 1 to 4). As described above, the reason for this is conjectured that electrical conductivity was improved by the layer structure analogous to LiBC forming solid solution with nitrogen.

In the negative electrode active material of each of examples 1 to 4, Li ions are present in interlayer portions of the layer structure in advance. As a result, the number of Li ions occluded by the negative electrode active material in the initial charging of the evaluation cell that uses the negative electrode active material of each of examples 1 to 4 is small. Li ions occluded by the negative electrode active material in the initial charging are released together Li ions present in interlayer portions in advance during an initial discharging.

The initial discharge capacity of the negative electrode active material of comparative example 3 was smaller than the initial discharge capacity of the graphite of comparative example 2. The reason for this is conjectured that the negative electrode active material of comparative example 3 had poor crystallinity and the number of sites that contribute to occlusion and release of Li ions was reduced.

The above-described results were used, and a maximum value and a minimum value of x/z of the negative electrode active material of each of examples 1 to 4 were estimated by calculation. Consequently, the maximum value of x/z was 1 and the minimum value was 0.2 to 0.4.

What is claimed is:

1. A negative electrode active material comprising:
    a plurality of layers each containing carbon and boron and each further containing nitrogen or phosphorus; and
    lithium located between the plurality of layers,
    wherein the negative electrode active material is represented by a formula $Li_xB_yC_zM_q$, where M is N or P, and $0<x\leq1$, $0<q<y<z\leq1$, and $0.6<y/z\leq0.91$.

2. The negative electrode active material according to claim 1,
    wherein y and z satisfy $0.67\leq y/z\leq0.91$.

3. The negative electrode active material according to claim 1,
    wherein y and q satisfy $0.1\leq q/y\leq0.5$.

4. The negative electrode active material according to claim 1,
    wherein M is N.

5. A secondary battery comprising:
    a negative electrode containing the negative electrode active material according to claim 1;
    a positive electrode; and
    an electrolyte having lithium-ion conductivity.

6. The secondary battery according to claim 5,
    wherein x and z satisfy $0.9<x/z<1.1$ in a fully charged state of the secondary battery.

* * * * *